Aug. 18, 1970          G. G. HAVENS          3,524,757
METHOD OF COATING A TUBE TO FORM A SEMIPERMEABLE MEMBRANE
Filed June 15, 1964          2 Sheets-Sheet 2
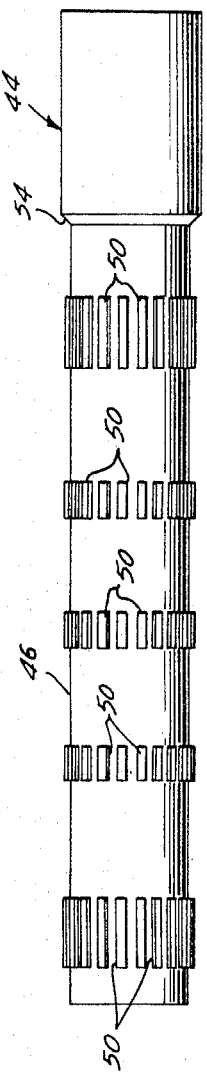
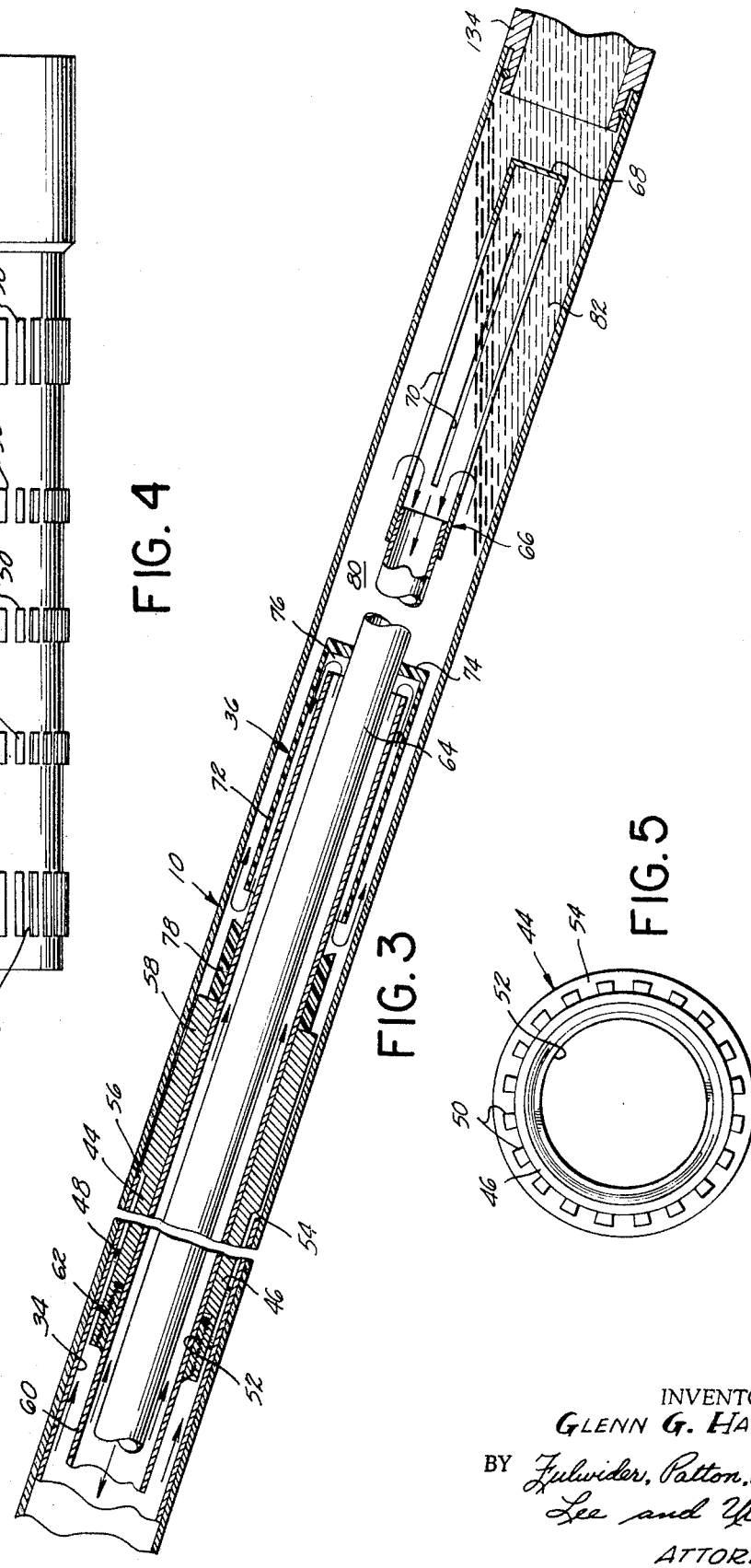
INVENTOR.
GLENN G. HAVENS
BY Fulwider, Patton, Rieber, Lee and Utecht
ATTORNEYS

United States Patent Office 3,524,757
Patented Aug. 18, 1970

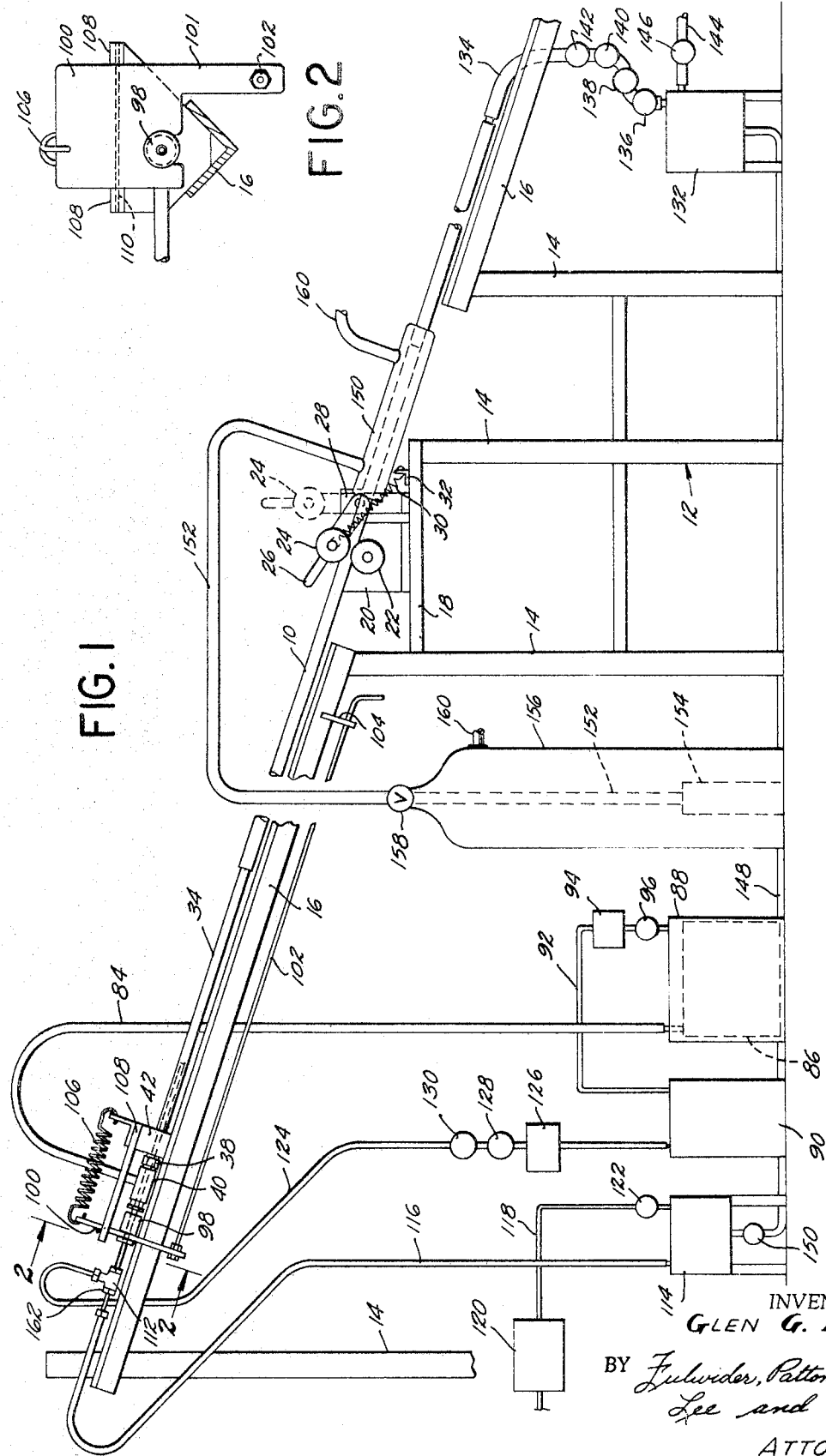

---

3,524,757
METHOD OF COATING A TUBE TO FORM A SEMIPERMEABLE MEMBRANE
Glenn G. Havens, San Diego, Calif., assignor to Havens International, San Diego, Calif., a corporation of California
Filed June 15, 1964, Ser. No. 374,928
Int. Cl. B05c 7/08; B01d 13/04
U.S. Cl. 117—95
8 Claims

ABSTRACT OF THE DISCLOSURE

A method of forming a reverse osmosis membrane within a porous tube by using a liquid material containing a solvent to coat successive circumferential portions of the interior of the tube, and then effective evolvement of the solvent.

---

The present invention relates to a coating method and apparatus, and more particularly to a method and apparatus for continuously applying and forming a liquid or viscous material upon the interior of tubing and the like to produce a membrane adapted to effect separation between a solvent and a solution in a reverse osmosis system.

There are a variety of liquid materials used for this purpose, one such being cellulose acetate modified by the addition of a mixture of acetone and an aqueous solution of magnesium perchlorate. This latter material is particularly useful in the extraction of potable or fresh water from sea water. Heretofore, a semipermeable membrane was produced with this material by pouring or casting the solution upon a flat surface, such as a glass plate or the like. The film was completely formed by successive, separate processing steps, including air drying and water immersion. The film was then transferred to a flat porous member constituting the structure for supporting the membrane upon subjection thereof to the relatively high pressures necessary to exude fresh water through the pores of the membrane and the porous member. Such a system and a variety of membrane materials therefor are more particularly described in U.S. Letters Patent Nos. 3,133,132 and 3,133,137, both issued on May 12, 1964, to S. Loeb et al.

It is an object of the present invention to provide a method and apparatus for casting or coating a membrane material directly upon the interior of a length of porous tubing. This permits the use of relatively inexpensive high structural strength tubing made of glass fibers or the like, and avoids the handling problems attendant the prior art method of casting the membrane material upon one surface and subsequently transferring it to the surface of the structure which supports the membrane during operation.

Another object of the invention is to provide a method and apparatus for contemporaneously accomplishing coating, drying, and water immersion of a membrane material applied to the interior of tubing and the like. Heretofore, the steps of coating, drying and water immersion were separately accomplished, which has certain disadvantages. It is believed to be helpful to an understanding of the importance of certain features of the present invention to briefly examine the nature of cellulose acetate membrane material and its proper formation.

More particularly, it is theorized that a properly formed membrane of the type described is composed of a relatively dense skin underlying which exists a comparatively porous composite. When the freshly applied membrane material is being dried, a skin first appears due to the evaporation of the acetone or other volatile constituents, in a manner similar to the drying of a thick paint film. The subsequent immersion of the partially dried membrane material in cold water slows further evolution of acetone so that such acetone gradually migrates into the water and is replaced or leached out by the water. By virtue of this gradual migration of acetone, and also because of certain properties of the magnesium perchlorate, very fine "pores" are produced, particularly in the denser skin portion, and it is theorized that these pores effect the desired filtration or separation between solvents and solutions such as fresh water and sea water. "Pores" is a term of convenience identifying the quality of the membrane to effect separation. Thus, to achieve optimum separation it becomes necessary to control those parameters which particularly affect the character of the membrane skin, including the rate, temperature and uniformity of coating, drying and water leaching of the membrane material, as well as the time intervals between these three steps.

For example, premature cessation of drying of the membrane subsequent its application prevents the desired formation of a fine-pored skin, while extended drying produces an unduly thick skin which offers too great a barrier to the separation, for example, of fresh water from sea water by exudation through the pores of the skin. This problem is also present, although to a lesser degree, in maintaining an optimum time interval between the drying step and the water leaching step.

The maintenance of optimum time intervals between coating and drying and between drying and leaching is difficult in a so-called "batch process" such as the prior art process referred to above. Because the three process steps are separately performed there is greater liability for error in timely transfer of the tubing from the coating station to the drying station and from the drying station to the leaching station, as well as extra handling costs and loss of time compared to a continuous process.

Therefore, it is an object of the present invention to provide a method and apparatus particularly adapted for continuously and contemporaneously coating a liquid membrane material upon the interior of tubing and the like, drying the material, and leaching the material under controlled conditions to provide a membrane skin of uniform character and optimum performance.

In addition to the difficulty of coordinating the individual steps of prior art membrane forming processes, the methods heretofore known for accomplishing particular ones of such steps have not been suitable for the treatment of tubes. For example, the drying of tubing interiorly coated with a liquid cellulose acetate mixture tends to produce nonuniform drying along the tubing length unless the evolving acetone is permitted to escape without producing an acetone concentration gradient along the length of the tube. This is also true of leaching by immersion in water. The leaching water tends to stagnate adjacent the membrane in a non-uniform manner, resulting in an unpredictable pattern of acetone concentration.

Accordingly, it is an object of the invention to provide a method and apparatus for continuously coating the interior of tubing and the like with a liquid semipermeable membrane material containing a volatile constituent, and contemporaneously drying the material, by continuously coating the material upon the tubing in a progressive manner axially of the tubing by means of an applicator telescoped within the tubing. Air is applied through the applicator to the freshly coated portions at substantially the same time, the air application thereby proceeding axially with the coating. In addition, air is exhausted through the applicator at a controlled rate to remove the volatile constituent in a uniform manner along the length of the tubing, and without carrying such constituent into contact with previously dried portions of the tubing. It is a related object of the invention to adjust the air supply and exhaust pressures to provide a positive air pressure region adjacent the freshly coated portion of the tubing so that the fresh coating is urged against the inner tube surface of such positive pressure until the coating is at least partially dried.

Another object of the invention is to provide a method and apparatus of the aforementioned character wherein the tubing is placed in an upright or slanted position and a liquid such as water is introduced into the tubing adjacent the freshly coated portions of the tubing. This defines a localized region or chamber through which air flow occurs, the length of this region and consequently the drying time being adjustable by varying the water level. The water also progressively covers the coated portions of the tubing as the coating and drying proceeds, and thereby effects a leaching action on the acetone and water soluble salts in the coating.

Another object of the invention is the provision of a method and apparatus susceptible of general utility for continuously coating the interior of tubing and the like with a liquid material containing a volatile constituent or constituents which must be removed at a uniform rate to thereby provide uniform drying conditions and a dried coating of uniform character throughout the length of the tubing. In this regard, a coating applicator is provided which is adapted to be inserted or axially telescoped within the tubing, adapted to be moved relative to the tubing to cause axial advancement of the applicator head along the length of the tubing, and adapted to discharge the desired coating material against the tubing interior. The applicator includes an air passage for directing a stream of dry air upon the freshly coated tubing surface, and further includes a passage for exhausting such air so that exhaust air with the volatile constituent is carried off at a uniform rate as the applicator head progresses down the length of the tube.

Other objects and features of the invention will become apparent from consideration of the following description taken in connection with the accompanying drawings, in which:

FIG. 1 is a side elevational view of a coating apparatus according to the present invention, portions thereof being shown diagrammatically and other portions being foreshortened for convenience of illustration;

FIG. 2 is an enlarged view taken along the line 2—2 of FIG. 1;

FIG. 3 is a longitudinal cross-sectional view of the coating applicator in position within a length of tubing to be coated;

FIG. 4 is a side elevational view of the applicator head; and

FIG. 5 is an end elevational view of the applicator head of FIG. 4.

Referring now to the drawings, there is illustrated an apparatus for continuously applying and forming a liquid or viscous material upon the interior of porous tubing to produce a membrane adapted to effect separation between fresh water and salt water in a reverse osmosis system. In the particular embodiment illustrated, eight foot lengths of porous tubing are interiorly coated with a liquid cellulose acetate material modified by the addition of a mixture of acetone and an aqueous solution of magnesium perchlorate.

Although the description of the present method and apparatus is directed to the use of this particular acetate solution, it should be understood that this is merely exemplary and that the method and apparatus is also adapted to apply various other membrane materials, as well as coatings such as resinous paints and other protective materials. That is, the invention is susceptible of general utility in the continuous coating of the interior of tubing and the like with any liquid material containing a volatile constituent which must be removed at a controlled rate to provide uniform drying.

The porous tubing to be internally coated with the acetate solution is indicated generally at 10, and is illustrated in an inclined or slanted position upon a frame 12. The tube 10 is preferably mounted in a position other than horizontal so that, when desired, water may be introduced into the lower end of the tube to define one face of an air pressure chamber extending axially of the tube. The frame 12 could be constructed to orient the tube 10 in a vertical position, but it is advantageous to utilize the slant arrangement illustrated where relatively long tubes are to be coated and the ceiling or overhead structure in the working area is not easily altered to accommodate the upper extremity of such a vertically disposed apparatus.

The frame 12 includes a plurality of posts or uprights 14 which support a V-shaped trough or angle 16 adjacent their upper extremities, as best viewed in FIG. 2. The length of the angle has been foreshortened in FIG. 1 for convenience.

The frame 12 also includes a horizontally oriented drive motor shelf 18 secured between a pair of the uprights 14 for supporting a conventional variable speed drive motor 20. A resilient, peripherally grooved drive roller 22 is mounted to the shaft of the drive motor 20 and supports the tube 10. An identical drive roller 24 is rotatably mounted to the lever 26 in confronting relation to the drive roller 22. The lever 26 is pivotable at its lower extremity about a pin carried at the upper extremity of a vertical post 28 and a tension spring 30 is mounted at its opposite extremities to the shaft of the drive roller 24 and to an angle bracket 32 which is secured to the motor shelf 18. The spring 30 is mounted in an over-center relationship so that its longitudinal axis in the full line position illustrated lies to one side of the pivot point on the post 28 about which the lever 26 pivots. With this arrangement, movement of the lever 26 to the full line position illustrated effects engagement of the roller 24 with the upper periphery of the tube 10, which is resting at its lower periphery upon the lower drive roller 22. In this position, the spring 30 exerts a bias which tends to pull the roller 24 into firm engagement with the tube 10 so that upon operation of the motor 20, the rollers 22 and 24 effect axial advancement of the tube 10 from left to right or downwardly, as viewed in FIG. 1.

As previously indicated, the lower extremity of the tube 10 is supported by the roller 22, while the upper extremity of the tube 10 is supported by a guide shaft or tube 34, which forms a part of a coating applicator 36. The guide tube 34 is closely slidably received within the interior of the tube 10 and has the important fuction of precisely guiding the applicator 36 along the length of the tube 10, as will be seen.

The upper extremity of the guide tube 34 is flared and rotatably mounts a tube coupling 38 which is threadably secured to a cylindrical fitting 40, the coupling 38 also preventing axial movement of the guide tube 34 by bearing against a fixed mount 42 secured to the inclined angle 16 and through which the tube 34 extends.

Referring now to FIG. 3, the guide tube 34, which is sufficiently long to extend throughout the length of the tube 10, closely slidably receives a cylindrical coating head 44 which is concentric with the guide tube 34. Both of these components are coaxial with the longitudinal axis of the tube 10. The coating head 44 includes an elongated shank portion 46 having an external diameter less than the internal diameter of the guide tube 34, and is characterized by a plurality of circumferential shoulders 48 which closely and slidably engage the interior of the guide tube 34 in a precision manner. Each shoulder 48, as best viewed in FIGS. 4 and 5, is provided with a plurality of axial slots 50 which are spaced uniformly about the circumference of the shank portion 46 to provide axial spaces or passages through which the cellulose acetate solution can flow, as will be seen.

The shank portion 46 is provided at one extremity with internal threads 52 and at its opposite extremity terminates in an inclined circumferential shoulder 54 which defines an acetate orifice 56 with the adjacent end edge of the guide tube 34. The inclined shoulder 54 forms a part of a larger diameter doctor ring 58 which has an external diameter less than the internal diameter of the tube 10, and the annular space between the ring 58 and the tube 10 thus define an annulus which determines the thickness of the acetate coating applied to the interior wall of the tube 10 by the ring 58.

The threads 52 permit the coating head 44 to be threadably mounted upon an externally threaded sleeve 62 of an axially extending coating tube 60 which is coaxial with the axis of the tube 10 and concentric with the guide tube 34.

The coating tube 60 extends beyond the doctor ring 58 in a downstream direction, which is to the right as viewed in FIG. 3, and is open at its lower end for discharging compressed air therethrough, as will be seen.

An axially extending exhaust tube 64, coaxial with the axis of the tube 10, and concentric with respect to both the coating tube 60 and the guide tube 34, extends throughout the length of the tube 60 and beyond it in a downstream direction, as best viewed in FIG. 3, terminating in an open end for exhausting fluid from the interior of the tube 10 downstream of the doctor ring 58, as will be more particularly described hereinafter.

A cylindrical exhaust diffuser 66 is closely press-fitted in overlying relation to the downstream end of the coating tube 60. The lower end of the diffuser 66 is closed by an end wall 68, and a plurality of axially extending, circumferentially spaced exhaust slots 70 are provided in the diffuser 66 for exhausting fluid in an upstream direction and out of the upper end of the tube 64.

A cylindrical air diffuser 72, made of a plastic material such as nylon or the like, closely receives the exhaust tube 64 through a central opening in an end wall 74 which is spaced from the adjacent edge of the coating tube 60 to define an air discharge passage 76. Forming a continuation of this air discharge passage 76 is the annular space between the exhaust tube 64 and the coating tube 60, and the annular space between the coating tube 60 and the cylindrical portion of the air diffuser 72. With this arrangement, air is directed in a downstream direction through the annular space inside the coating tube 60, and then on to the end wall 74. The wall 74 reverses the direction of air flow and channels the air through the annular space inside the air diffuser 72 for discharge against the interior wall of the tube 10 in the region of the coating freshly applied by the doctor ring 58.

A collar 78 made of a plastic such as nylon is press-fitted about the exterior of the coating tube 60. One extremity of the collar 78 abuts the adjacent end of the doctor ring 58 and the opposite extremity is chamfered or beveled to direct the flow of air from the diffuser 72 radially outwardly of the collar 78 substantially in a plane normal to the axis of the tubing 10 for drying the coating thereon. From this point the air passes to the right, as viewed in FIG. 3, in a downstream direction through the annular space defined between the inner surface of the tube 10 and the outer surface of the air diffuser 72. As will be described more particularly hereinafter, the lower extremity of the tube 10 may be closed so that an air drying chamber 80 is defined between such closed end and the doctor ring 58 in the annular spaces not occupied by the coating applicator 36.

The air discharged from the coating tube 60 into this air chamber 80 is exhausted through the exhaust slots 70 of the exhaust diffuser 66 for passage in an upstream direction through the interior of the exhaust tube 64.

The structure thus far described is adapted to continuously coat successive circumferential portions of the interior of the tubing 10 in a progressive manner and in an axial direction, while contemporaneously drying the freshly coated portion immediately subsequent the coating operation so that uniform conditions of coating and drying are provided. The air from within the coating tube 60 is applied in a localized region adjacent the tube portion just coated by the doctor ring 58, and flows in a downstream direction with the evolved volatile constituents of the coating material. The drying path of the air is a relatively short distance, terminating at the diffuser 66 which exhausts it out of the air drying chamber 80. The length of the tube 10 dried in this manner is approximately five and one-half to six inches in the embodiment illustrated.

Where the material to be applied to the interior of the tubing 10 is a resin or the like for interiorly coating pipe, or is a membrane forming material not requiring immediate cold water immersion, the coating and drying steps just described are sometimes sufficient to form the protective coating or to initially form the membrane for subsequent processing. However, with particular types of membrane coating materials, such as the previously mentioned cellulose acetate modified by the addition of a mixture of a solvent such as acetone and an aqueous solution of a pore forming agent such as magnesium perchlorate, it is usually preferable to progressively immerse the coated and dried material immediately subsequent drying.

Water immersion is accomplished in the present apparatus by introducing cold water 82 through the lower end of the tube 10. The water 82 enters the air chamber 80 and thereby defines a liquid barrier constituting the downstream wall or lower extremity of such air chamber for developing a positive pressure upon the freshly coated material, as will be seen. That is, the pressurized air and water establish a positive pressure in the drying chamber 80 which tends to force the coating against the interior surface of the tubing for better adherence until the coating is sufficiently dried to support itself and not sag. In addition, immersion of the partially dried coating material in water permits the water to leach out acetone and the water soluble salts in the coating, the leached material being carried through the exhaust slots 70 of the exhaust diffuser 66 in an upstream direction through the hollow exhaust tube 64.

With this arrangement both the drying air and the leaching water in the drying chamber 80 are continuously carried out of the tube 64 to prevent undesirable acetone concentration adjacent the coated portion of the tube, particularly at the air-water interface in contact with such coated portion. As will be seen, both the air and the water are applied under pressure which is adjusted to provide a drying chamber 80 having a length of approximately five and one-half to six inches.

Coating and drying of the tube 10 is facilitated by first mounting a pair of cylindrical sleeves (not shown) at the opposite extremities of the tube 10. These sleeves are of the same inside diameter as the tube 10, approximately one-half inch, and temporarily attached in abutting relation to the tube by any suitable means, such as by a good quality adhesive tape. The sleeves thus constitute extensions of the tube 10 which are attached only for tube processing by the present apparatus. By using the extension sleeves, coating can be begun adjacent the lower extremity of the tube 10, preferably within the extension sleeve section, and continued into the area of the other sleeve section. This allows an opportunity for the temperature and other conditions of coating and drying, for example, to stabilize so that the tube 10 may be uniformly coated from one end to the other.

The upper extremities of the substantially coextensive guide tube 34, coating tube 60, and exhaust tube 64 are connected to sources of cellulose acetate, compressed air, and vacuum, as will next be described. More particularly, the upper extremity of the guide tube 34, which is connected to and terminates at the fitting 40, opens into the hollow interior of the fitting. The fiting axially slidably accommodates the coating tube 60, but cellulose acetate solution is introduced into the remaining unoccupied portion of the interior of the fitting 40 by a conduit 84 connected to a flexible, sealed bag 86 located within a pressure container 88. Cellulose acetate in the bag 86 is forced out by air under pressure introduced into the container 88 and about the bag. A pressurized air source, such as a compressor 90, is provided for this purpose and is connected by a conduit 92 to the interior of a container 88 through a conventional air filter 94 and an air pressure regulator 96. The air filter removes moisture and other contaminants in the air supplied by the compressor.

The upper extremity of the coating tube 60, which is slidably disposed through the fitting 40, is fixedly gripped by a clamp 98 at a point beyond and spaced from the fitting. The clamp 98, as best viewed in FIG. 2, includes a peripheral groove which receives an actuating plate 100 having a depending arm 101 which mounts one extremity of an axially extending actuator rod 102. The opposite or lower extremity of the rod 102 is slidable within a suitable opening in a bracket 104 which is fixed to the underside of the trough 16.

The upper portion of the plate 100 mounts one extremity of a tension spring 106 whose opposite extremity is mounted to the fixed mount 42 so that the spring 106 tends to bias the plate 100 toward the fixed mount 42 and axially carry the coating tube 60 with it. The axial travel of the plate 100 is guided by a pair of axially extending guide elements 108 secured thereto by a transverse pin 110, the opposite extremities of the elements 108 sliding within shoulders or ways (not shown) provided in the fixed mount 42.

Thus, by axially pulling upon the lower extremity of the rod 102, the operator of the present apparatus can move the coating tube 60 downwardly relative to the stationary guide tube 34 to thereby open the normally closed acetate orifice 56. The actuator rod 102 may be locked in an open position by any suitable means (not shown) during a coating operation, and when unlocked the bias of the spring 106 tends to return the tube 60 to its upper position for closing the orifice 56.

The upper extremity of the exhaust tube 64 extends in fluid-tight relationship through end openings in a T-fitting 112 and is connected to a vacuum tank 114 by a vacuum line 116. A vacuum is developed in the tank 114 through a vacuum pump conduit 118 which opens into the upper portion of the interior of the tank 114 and is connected to a usual vacuum pump 120 through a vacuum gauge 122. The pump 120 conveniently exhausts to atmosphere.

The T-fitting 112 is hollow and defines an annular space about the exhaust tube 64 which extends therethrough. This annular space is connected by a suitable conduit coupling nut 162 to the end of the coating tube 60 so as to afford a path for compressed air to the annular space between the tubes 60 and 64 for discharge through the air diffuser 72. The compressed air is supplied by the compressor 90 through an air line 124 which includes an air filter 126, an air pressure regulator 128, and an air flow meter 130.

As previously indicated, the cellulose acetate material mentioned herein by way of example is preferably quenched or leached in cold water immediately following the drying operation. The cold water 82 for this purpose is supplied from a refrigerated leach water tank 132 which maintains the water at approximately 32° F. The tank 132 is connected by a water hose 134 to the lower end of the tube extension sleeve abutting the lower extremity of the tube 10, the water path including, as diagrammatically illustrated in FIG. 1, a water pump 136, a valve 138, a pressure guage 140, and a water flow meter 142. Supply water to the tank 132 is provided through a conduit 144 which includes a valve 146.

Referring now to FIG. 3, it is noted that the diffuser exhaust slots 70 are located at the air-water interface, when leach water is utilized, so that an air-water mixture is carried upwardly through the exhaust tube 64 to the vacuum tank 114. The water from this mixture falls to the bottom of the tank 114 and is pumped to the water tank 132 through a conduit 148, which includes a valve 150, for recirculation in the system.

In certain instances it is advisable to maintain a relatively low environmental temperature about the exterior of the tube 10 adjacent the coating applicator 36. For this purpose, an open-ended insulating muff or sleeve 150 is mounted concentric with the applicator 36 and is adapted to axially slidably receive the tube 10. The sleeve 150 includes a closed annular space which is supplied with a coolant through a supply conduit 152 which is connected through a valve 158 to a submersible pump 154 located within a refrigerated coolant tank 156. In addition, a coolant exhaust conduit 160 is connected between the inner annulus of the sleeve 150 and the coolant tank 156 to provide a coolant return path to the tank, a suitable coolant for this purpose being methyl glycol or the like preferably maintained at a temperature of approximately −10° F.

The apparatus above-described is operated by starting the vacuum pump 120 to develop a vacuum in the drying chamber 80. In a typical application of the cellulose acetate coating at a rate of six inches per minute of tube travel, the vacuum gauge 122 is adjusted to provide a vacuum of approximately ten to twelve inches of mercury. Next, the air compressor 90 is started and the pressure regulator 128 set for a pressure of approximately 11 p.s.i.

The flow rate of the cellulose acetate is preferably adjusted to provide an applied coating approximately .012 inch thick at the tube advance rate of six inches per minute. The viscosity of the cellulose acetate in the bag 86 varies somewhat in accordance with environmental conditions, but an air pressure in a range of 20 to 30 p.s.i. at the regulator 96 produces satisfactory results. In addition, the pump 154 in the coolant tank 156 is next actuated to circulate the methyl glycol coolant.

The tube 10 to be coated is next mounted in position with its pair of extension sleeves attached, and the drive roller 24 moved into engagement therewith. Next, the hose 134 is attached to the lower extension sleeve of the tube 10, the valve 138 opened, and the pump 136 operated to carry leaching water into the drying chamber 80. The water pressure gauge 140 is adjusted to provide an initial pressure of approximately 2 to 3 p.s.i. and the flow meter 142 adjusted to provide a flow of approximately 350 cc. per minute. After the temperatures in the coating area have reached a steady state, the actuator rod 102 is pulled to permit the acetate to flow between the tubes 34 and 60 for discharge through the orifice 56. The drive motor 20 is then started and adjusted to provide the desired relative movement between the tube 10 and the applicator 36 at a tube advance rate of six inches per minute.

The leaching water pressure is now raised to approximately 8 p.s.i. and the flow rate altered to about 700 cc. per minute. At the same time the air flow is adjusted to about 330 cc. per minute, providing a positive pressure within the drying chamber 80 of approximately 5 p.s.i. This has the desired effect of driving air and leach water through the exhaust diffuser 66 and out the tube 64, and also tends to urge the fresh coating against the interior tube surface. If desired, the air or other gaseous medium, which is utilized to carry off the evolved acetone or other solvent of the material being coated, may itself incorporate a vapor of such acetone or solvent to provide a modifying effect upon the solvent evolution from the freshly coated material. In this manner, such solvent evolution is more closely controlled, which is important in those instances where such evolution is otherwise uncontrollably excessive.

The level of the leach water in the drying chamber 80 acts as a liquid barrier defining the length of the chamber, with the water level controlled by the relative position of the suction slots 70 in the exaust diffuser 66.

After the tube 10 has been completely advanced so that the applicator 36 has coated the entire interior of the tube 10, the orifice 56 is closed and the quench water, vacuum, and supply air turned off to permit removal of the coated tube.

The removed tube is then subjected to further processing steps, in accordance with the nature of the particular material. Typically, a tube having a cellulose acetate coating of the type herein mentioned is maintained in water for a predetermined period of time after completion of the coating, drying, and leaching by the present apparatus, and is thereafter subjected to a higher temperature water soaking followed by water soaking at a reduced temperature until installed for use. Such processing details do not form a part of the present invention. Moreover, the values set forth above for temperatures, pressures, flow rates and the like are merely exemplary and not limiting. For example, merely increasing the rate of tube advance to twelve inches per minute will require adjustment of rate of air flow and the leach water pressure, and any change in the air flow through the drying chamber 80 requires an adjustment of the water flow, and vice versa, to maintain a desired air chamber length or drying period.

The distance between the free surface of the water 82 and the downstream edge of the doctor ring 58 defines the air chamber length herein referred to, and it will be apparent that the length of this chamber has an important effect on the degree of drying of the coating. By loosening a clamping nut 162, which forms a part of the T-fitting 112, the tube 64 may be slid axially, which adjusts the drying chamber length by altering the position of the exhaust diffuser 66. After the axial position of the tube 64 has been adjusted, the nut 162 can be clamped up tight to again secure the tube 64 to the fitting 112.

Should the introduction of leaching water into the chamber 80 not be desired, the valve 138 is shut off so that the inflowing air is enabled to develop a positive pressure within the air chamber 80. Of course, the lower end of the tube 10 could instead be closed off, if desired.

From the foregoing it will be apparent that the present method and apparatus is adapted to coat or cast a semipermeable membrane upon the interior of tubing for use in a reverse osmosis system. In addition, the method and apparatus is also adapted to substantially simultaneously coat the interior of tubing with other liquid materials containing volatile constituents, and also dry the coating while maintaining positive air pressure in the drying zone. Also, when desired, leaching water can be contemporaneously applied to the drying zone to thereby adapt the present apparatus and method for the coating of certain cellulose acetate materials which must be water immersed immediately subsequent coating and drying operations.

Various modifications and changes may be made with regard to the foregoing detailed description without departing from the spirit of the invention or the scope of the following claims.

I claim:

1. The method of coating directly upon the interior of tubing a liquid material comprising cellulose acetate and a volatile constituent which is evolved on drying to form a semipermeable membrane, said method comprising the steps of:
continuously coating said liquid material upon successive circumferential portions of the interior surface of said tubing in a progressive manner axially of said tubing;
continuously applying air under pressure to the freshly coated portions in a progressive manner along the length of said tubing and contemporaneous with said coating;
continuously exhausting said air at a rate low enough to maintain a region of positive air pressure adjacent the freshly coated portion to which said air is being applied thereby to urge the material on said freshly coated portion against the tubing, and yet at a rate high enough to remove said volatile constituent;
and continuously introducing water under pressure into said region of positive air pressure, and continuously removing said water with the exhausted air, whereby the free surface of said water successively covers the freshly coated portions of said tubing in a progressive manner.

2. The method of forming a semipermeable membrane upon the interior surface of tubing by using a liquid membrane material of the type which includes a volatile constituent which evolves at least partially during the formation of said membrane, said method comprising the steps of:
coating said liquid material upon successive circumferential portions of the interior surface of said tubing in a continuous and progressive manner axially of said tubing;
providing a movable barrier across said tubing, and moving said barrier axially of said tubing and over the freshly coated portions of said tubing as said coating proceeds;
and introducing a flow of fluid into said tubing ahead of said barrier and thereafter exhausting said fluid out of said tubing to carry off a controlled amount of said volatile constituent evolving from the freshly coated portion of said tubing ahead of said barrier.

3. The method of claim 2 wherein said movable barrier comprises a slug of an aqueous solution whose free surface successively covers the freshly coated portions of said tubing as said coating proceeds.

4. The method of claim 2 wherein said liquid material is a cellulose acetate solution.

5. The method of claim 2 wherein said fluid is air continuously applied under pressure and continuously exhausted at a rate low enough to maintain a region of positive air pressure adjacent said freshly coated portion ahead of said barrier.

6. The method of claim 2 wherein there is incorporated in said flow of fluid a volatile constituent identical to said volatile constituent in said liquid material thereby to control the amount of evolution of the latter volatile constituent.

7. The method of forming a semipermeable membrane upon the interior surface of tubing by using a liquid membrane material of the type which includes a volatile constituent which evolves at least partially during the formation of said membrane, said method comprising the steps of:
coating said liquid material upon successive circumferential portions of the interior surface of said tubing in a continuous and progressive manner axially of said tubing, and with an element forming a fluid barrier ahead of the deposited coating;
introducing a slug of an aqueous solution in said tubing to form a fluid barrier in spaced relation to the barrier formed by said element, and moving said slug to successively cover the freshly coated portions of said tubing as said coating proceeds; and
continuously introducing air into the space between said barriers and continuously exhausting said air from said space to remove said volatile constituent at a controlled rate.

8. The method of forming a semipermeable membrane upon the interior surface of tubing by using a liquid membrane material of the type which includes a volatile constituent which evolves at least partially during the formation of said membrane, said method comprising the steps of:
- introducing a quantity of said liquid material into said tubing;
- introducing a slug of an aqueous solution in said tubing behind said liquid material with an air space therebetween; and
- moving said slug of aqueous solution and said liquid material axially of said tubing, with said liquid material ahead of said aqueous solution, whereby said liquid material is coated upon successive circumferential portions of the interior surface of said tubing in a continuous and progressive manner, immediately followed by immersion of the freshly coated portions of said tubing in said aqueous solution.

References Cited

UNITED STATES PATENTS

| | | |
|---|---|---|
| 1,956,722 | 5/1934 | Kennedy. |
| 2,126,556 | 8/1938 | Hughes. |
| 3,108,012 | 10/1963 | Curtis _____ 117—95 |
| 1,057,823 | 4/1913 | Grenet _____ 210—490 |
| 3,133,132 | 5/1964 | Loeb et al. |
| 3,157,244 | 11/1964 | Lichtey _____ 117—95 X |
| 3,301,736 | 1/1967 | Smith _____ 117—95 X |

RALPH S. KENDALL, Primary Examiner

U.S. Cl. X.R.

117—119.6; 210—321; 118—58, 254, 408, 105